(12) United States Patent
Song et al.

(10) Patent No.: US 12,520,195 B2
(45) Date of Patent: Jan. 6, 2026

(54) APPARATUS AND METHOD FOR TRANSMITTING E2 MESSAGE IN WIRELESS COMMUNICATION SYSTEM

(71) Applicant: Samsung Electronics Co., Ltd., Suwon-si (KR)

(72) Inventors: Junhyuk Song, Suwon-si (KR); Chungkeun Lee, Suwon-si (KR); Yujin Tae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 366 days.

(21) Appl. No.: 18/349,595

(22) Filed: Jul. 10, 2023

(65) Prior Publication Data

US 2023/0362731 A1    Nov. 9, 2023

Related U.S. Application Data

(63) Continuation of application No. PCT/KR2022/002380, filed on Feb. 17, 2022.

(30) Foreign Application Priority Data

Feb. 17, 2021    (KR) ........................ 10-2021-0021493

(51) Int. Cl.
*H04W 28/08* (2023.01)
*H04W 28/02* (2009.01)

(52) U.S. Cl.
CPC ... *H04W 28/0942* (2020.05); *H04W 28/0236* (2013.01); *H04W 28/0268* (2013.01)

(58) Field of Classification Search
None
See application file for complete search history.

(56) References Cited

U.S. PATENT DOCUMENTS

| 2015/0208274 A1 | 7/2015 | Himayat et al. |
| 2019/0082490 A1 | 3/2019 | Zhang et al. |

(Continued)

FOREIGN PATENT DOCUMENTS

| CN | 111510959 A | 8/2020 |
| CN | 111565418 A | 8/2020 |

(Continued)

OTHER PUBLICATIONS

ORAN-WG3.E2SM-NI-v01.00.00, O-RAN Working Group 3 Near-Real-time RAN Intelligent Controller E2 Service Model (E2SM), RAN Function Network Interface (NI), 2020.

(Continued)

*Primary Examiner* — Andre Tacdiran
(74) *Attorney, Agent, or Firm* — Jefferson IP Law, LLP

(57) ABSTRACT

The disclosure relates to a $5^{th}$ generation (5G) or pre-5G communication system for supporting a data transmission rate higher than $4^{th}$ generation (4G) communication systems such as long term evolution (LTE). An apparatus of an E2 node is provided. The apparatus includes at least one transceiver and at least one processor, wherein the at least one processor is configured to transmit a first indication message to a radio access network (RAN) intelligent controller (RIC) through an E2 interface and transmit a second indication message to the RIC through the E2 interface, wherein the first indication message includes a measurement container, the measurement container includes measurement information and label information about a category related to measurement, the second indication message includes a reference indicator, and the reference indicator may indicate to use the measurement information or label information of the first indication message.

16 Claims, 11 Drawing Sheets

(56) References Cited

U.S. PATENT DOCUMENTS

| | | | |
|---|---|---|---|
| 2020/0314826 A1 | 10/2020 | Sharma et al. | |
| 2023/0129575 A1* | 4/2023 | Chou | H04W 24/02 370/329 |

FOREIGN PATENT DOCUMENTS

| | | | |
|---|---|---|---|
| CN | 111642011 A | | 9/2020 |
| WO | WO2022046756 | * | 3/2022 |
| WO | WO2022182396 | * | 9/2022 |

OTHER PUBLICATIONS

O-RAN.TIFG.E2ETSTFWK.0-v01.00, O-RAN Test and Integration Focus Group End-to-End System Testing Framework Specification, 2020.

Connor Craven, What Is Open RAN (Radio Access Network)?, Feb. 2, 2021.

3GPP TSG-SA5 Meeting #133e, S5-205355, O-Ran—3GPP Cooperation on Management Services, Oct. 12-21, 2020.

Open RAN, https://www.3gpp.org/news-events/2150-open_ran, Jan. 20, 2021.

International Search Report dated Jun. 3, 2022, issued in International Patent Application No. PCT/KR2022/002380.

"O-RAN Working Group 3, Near-Real-time RAN Intelligent Controller, E2 Application Protocol (E2AP)", O-RAN.WG3.E2AP-v01.01 Technical Specification, Jul. 15, 2020.

Song J, "O-Ran Working Group 3 Near-Real-time RAN Intelligent Controller E2 Service Model (E2SM) KPM", ORAN-WG3.E2SM-KPM-v01.00.0 Technical Specification, Feb. 1, 2020.

"ORAN-WG3.E2SM-NI-v01.00.00, O-RAN Working Group 3 Near-Real-time RAN Intelligent Controller E2 Service Model (E2SM)", Ran Function Network Interface (NI), Jan. 31, 2020.

Extended European Search Report dated Jun. 18, 2024, issued in European Application No. 22756529.8-1215.

* cited by examiner

FIG.10

Message at Sequence Number N (1010)

| Measurement Information List | | | | |
|---|---|---|---|---|
| Item | Performance Measurement Label | PRB usage | | |
| | | Cell=1 | | |
| | | PLMN=1 | | |
| | | Slice=1 | | |
| | | 5QI=1 | | |
| Item | Performance Measurement Label | PRB usage | | |
| | | 5QI=2 | | |
| | | Override=on | | |
| Item | Performance Measurement Label | PRB usage | | |
| | | Slice=3 | | |
| | | 5QI=1 | | |
| | | Override=on | | |
| Measurement Information Sequence Number | N | | | |

Message at Sequence Number N+1 (1020)

| Measurement Information List | | | |
|---|---|---|---|
| Item | Performance Measurement Label | PRB usage | |
| Item | Performance Measurement Label | PRB usage | |
| | | 5QI=2 | |
| | | Override=on | |
| Item | Performance Measurement Label | PRB usage | |
| | | Slice=3 | |
| | | 5QI=1 | |
| | | Override=on | |
| Precedent Message Label Override Indication | Precedent Message Label Override=on | | |
| Measurement Information Sequence Number | N+1 | | |

APPARATUS AND METHOD FOR TRANSMITTING E2 MESSAGE IN WIRELESS COMMUNICATION SYSTEM

CROSS-REFERENCE TO RELATED APPLICATION(S)

This application is a continuation application, claiming priority under § 365(c), of an International application No. PCT/KR2022/002380, filed on Feb. 17, 2022, which is based on and claims the benefit of a Korean patent application number 10-2021-0021493, filed on Feb. 17, 2021, in the Korean Intellectual Property Office, the disclosure of which is incorporated by reference herein in its entirety.

BACKGROUND

1. Field

The disclosure relates to an apparatus and a method for terminal-specific performance measurement on an E2 interface in a radio access network, and slice-specific resource measurement of a base station. The disclosure relates to a container-based measurement message transfer apparatus and method when a service event for a base station following an open radio access network (O-RAN) standard occurs by using an E2 message of a wireless communication system. A state report message included in the disclosure supports efficient reduction of a traffic bandwidth through a scheme of utilizing a form of a label and reducing redundant information. In addition, the disclosure proposes a unified E2 message format so that E2 nodes can use the existing E2 message, which has been divided into a distributed unit (DU), a central unit (CU)-user plane (UP), and a CU-control plane (CP) for 5th generation core (5GC) and evolved packed core (EPC), in a unified manner, regardless of distinguishment between 5GC and EPC.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "beyond 4G network" communication system or a "post long term evolution (post LTE)" system.

The 5G communication system is considered to be implemented in ultrahigh frequency bands (e.g., 60 gigahertz (GHz) bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems.

In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

In order to meet the demand for wireless data traffic, a 5G system and new radio or next radio (NR) have been commercialized, and it is expected that services of a high data transmission rate are provided to users through a 5G system like 4G, and wireless communication services having various purposes, such as Internet of Things (IoT) and a service requiring high reliability for a specific purpose, will be provided. An open radio access network (O-RAN), which was established by operators and equipment providers in a system mixed with a 4G communication system and a 5G system, defines new network element (NE) and interface standards based on existing 3GPP standards, and suggests an O-RAN structure.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for transmitting performance measurement information to a radio access network (RAN) intelligent controller (RIC) by an E2 node in a wireless communication system. The existing E2 message format having a hierarchical structure has a limitation in that complexity may increase according to a parameter and it is difficult to be commonly used. In addition, consecutive messages include redundant information, and thus a scheme of efficiently using a communication resource is required. Through the disclosure, an E2 message may be supported in the form of having upper compatibility and expandability, and redundant information included in the consecutive messages can be minimized, whereby a function of efficiently reducing a traffic bandwidth can be provided.

Another aspect of the disclosure is to provide a unified E2 message format so that E2 nodes can use the existing E2 message, which has been divided according to a type of each E2 node and 5CG and EPC, in a unified manner, regardless of distinguishment between 5GC and EPC. Such unification of the E2 message format can reduce complexity.

As $4^{th}$ generation/$5^{th}$ generation communication systems (hereinafter, referred to as 4G/5G systems or new radio or next radio (NR)) are currently commercialized, there is a demand for support of a differentiated service for a user in a virtualized network. The O-RAN newly defined the existing 3GPP network element (NE), radio unit (RU), DU, CU-CP, CU-UP as the O-RAN RU (O-RU), O-RAN DU (O-DU), O-RAN CU-CP (O-CU-CP), O-RAN CU-UP (O-CU-UP), respectively, and additionally standardized a near-real-time RAN intelligent controller (RIC). Here, the O-RU, O-DU, O-CU-CP, O-CU-UP may be understood as entities constituting the RAN, which may operate according to O-RAN standards, and may be referred to as E2 nodes. The RIC generates an E2 subscription request message, and transmits the same to the E2 node (e.g., the O-CU-CP, O-CU-UP, and O-DU), thereby setting up a call processing event. After setting up the event, the E2 node transfers a subscription request response message to the RIC. The disclosure relates to an E2 indication message for transmitting performance measurement information between the RIC and the E2 node.

To solve the above-described problems, the disclosure proposes including an indicator (e.g., precedent message label override indication) in an E2 indication message. When redundant information is included in consecutive message, an E2 node may transfer only new information other than redundant information by referring to an item and a value of a precedent message of the corresponding message through a specific indicator. In addition, embodiments of the disclosure unify the existing E2 message which has been divided according to a type of an E2 node, like a DU, a CU-UP, and a CU-CP for 5GC and EPC, by including an E2 node performance measurement container. Through the corresponding measurement container, E2 nodes may use E2 messages as one type of container in a unified manner.

Additional aspects will be set forth in part in the description which follows and, in part, will be apparent from the description, or may be learned by practice of the presented embodiments.

In accordance with an aspect of the disclosure, a method performed by an E2 node is provided. The method includes transmitting a first indication message to a radio access network (RAN) intelligent controller (RIC) through an E2 interface, and transmitting a second indication message to the RIC through the E2 interface, wherein the first indication message includes a measurement container, the measurement container includes measurement information and label information relating to a category related to measurement, the second indication message includes a reference indicator, and the reference indicator indicates to use the measurement information or the label information of the first indication message.

In accordance with another aspect of the disclosure, a method performed by a radio access network (RAN) intelligent controller (RIC) is provided. The method includes receiving a first indication message from an E2 node through an E2 interface, and receiving a second indication message from the E2 node through the E2 interface, wherein the first indication message includes a measurement container, the measurement container includes measurement information and label information relating to a category related to measurement, the second indication message includes a reference indicator, and the reference indicator indicates to use the measurement information or the label information of the first indication message.

In accordance with another aspect of the disclosure, an apparatus of an E2 node is provided. The apparatus includes at least one transceiver and at least one processor, wherein the at least one processor is configured to transmit a first indication message to a radio access network (RAN) intelligent controller (RIC) through an E2 interface, and transmit a second indication message to the RIC through the E2 interface, the first indication message includes a measurement container, the measurement container includes measurement information and label information relating to a category related to measurement, the second indication message includes a reference indicator, and the reference indicator indicates to use the measurement information or the label information of the first indication message.

In accordance with another aspect of the disclosure, an apparatus of a radio access network (RAN) intelligent controller (RIC) is provided. The apparatus includes at least one transceiver and at least one processor, wherein the at least one processor is configured to perform a method including receiving a first indication message from an E2 node through an E2 interface, and receiving a second indication message from the E2 node through the E2 interface, the first indication message includes a measurement container, the measurement container includes measurement information and label information relating to a category related to measurement, the second indication message includes a reference indicator, and the reference indicator indicates to use the measurement information or the label information of the first indication message.

An apparatus and method according to various embodiments of the disclosure can reduce a traffic bandwidth during transmission of an E2 message by including an indicator in the E2 message, and unify an E2 message type, thereby reducing complexity.

Other aspects, advantages and salient features of the disclosure will become apparent to those skilled in the art from the following detailed descriptions, taken in conjunction with the annexed drawings, discloses various embodiments the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 10 illustrates an example of an RIC indication message according to an embodiment of the disclosure.

Throughout the drawings, it should be noted that like reference numbers are used to depict the same or similar elements, features, and structures.

DETAIL DESCRIPTION

Figure 1:
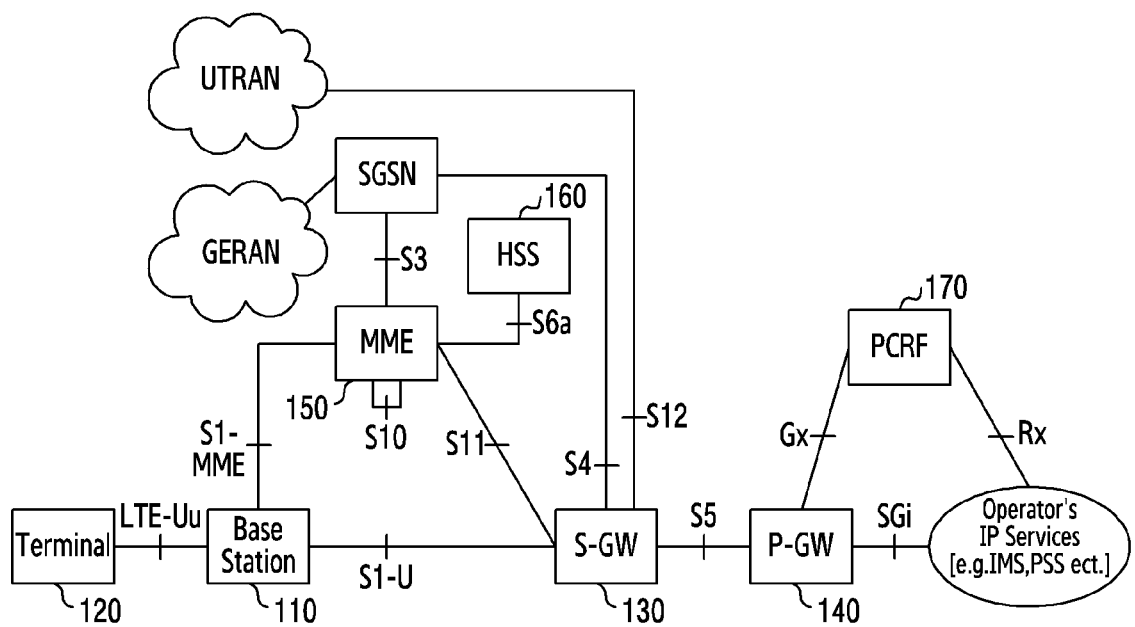
FIG. 1 illustrates an example of a $4^{th}$ generation (4G) long-term evolution (LTE) core system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, the disclosure relates to an apparatus in a radio access network and an apparatus and method for performing a report procedure between apparatuses controlling a RAN in a wireless communication system.

In the following description, terms referring to signals, terms referring to channels, terms referring to control information, terms referring to network entities, terms referring to device elements, and the like are illustratively used for the sake of descriptive convenience. Therefore, the disclosure is not limited by the terms as used below, and other terms referring to subjects having equivalent technical meanings may be used.

In the disclosure, the expression "greater than" or "less than" is used to determine whether a specific condition is satisfied or fulfilled, but this is intended only to illustrate an example and does not exclude "greater than or equal to" or "equal to or less than". A condition indicated by the expression "greater than or equal to" may be replaced with a condition indicated by "greater than", a condition indicated by the expression "equal to or less than" may be replaced with a condition indicated by "less than", and a condition indicated by "greater than and equal to or less than" may be replaced with a condition indicated by "greater than and less than".

In the disclosure, various embodiments will be described using terms employed in some communication standards (e.g., the 3rd generation partnership project (3GPP)), but they are only for the sake of illustration. The embodiments of the disclosure may also be easily applied to other communication systems through modifications.

As a $4^{th}$ generation (4G)/5th generation (5G) communication system (e.g., new radio (NR)) has been commercialized, it is required to support a user-differentiated service in a virtualized network. Accordingly, an open radio access network (RAN) (O-RAN) has newly defined a 3GPP network element (NE), a radio unit (RU), a distributed unit (DU), a central unit (CU)-control plane (CP), and a CU-user plane (UP) as an O-RU, an O-DU, an O-CU-CP, and an O-CU-UP, respectively. In addition thereto, the O-RAN has standardized a near-real-time RAN intelligent controller (RIC). The disclosure relates to supporting an operator-specific service model in an E2 interface through which an RIC requests a service from the O-DU, the O-CU-CP, or the O-CU-UP. Here, the O-RU, the O-DU, the O-CU-CP, and the O-CU-UP may be understood as objects constituting a RAN which may operate according to the O-RAN standard, and may be referred to as E2 nodes. As an interface with the objects constituting the RAN which can operate according to the O-RAN standard between the RIC and the E2 nodes, an E2 application protocol (E2AP) is used.

The RIC is a logical node capable of collecting information in a cell site in which a terminal performs transmission/reception with the O-DU, O-CU-CP, or O-CU-UP. The RIC may be implemented as a form of a server deployed in one physical place in a concentrated manner. A connection between the O-DU and the RIC, between the O-CU-CP and the RIC, and between the O-CU-UP and the RIC may be established through the Ethernet. To this end, an interface standard for communication between the O-DU and the RIC, between the O-CU-CP and the RIC, and between the O-CU-UP and the RIC is required, and a message standard such as E2-DU, E2-CU-CP, and E2-CU-UP and a definition of a procedure between the RIC and the O-DU, O-CU-CP, and O-CU-UP are required. Specifically, a user-differentiated service is required in a virtualized network, and there is a need for defining a function of a message of the O-DU, O-CU-CP, O-CU-UP, and RIC to support a service for wide cell coverage by allowing a call processing message/function generated in the O-RAN to be concentrated in the RIC.

The RIC may perform communication with the O-DU, the O-CU-CP, and the O-CU-UP by means of an E2 interface, and configure an event occurrence condition by generating and transmitting a subscription message. Specifically, the RIC may generate an E2 subscription request message and transfer the same to an E2 node (e.g., O-CU-CP, O-CU-UP, and O-DU) to configure a call processing event. In addition, after the configuration of the event, the E2 node transfers a transferred subscription request response message to the RIC.

The E2 node may transmit a current state to the RIC through an E2 indication/report. The RIC may provide control over the O-DU, the O-CU-CP, and the O-CU-UP through an E2 control message. Various embodiments of the disclosure propose an E2 indication message through which UE-unit measurement information is transmitted for each period configured in the subscription event condition by the O-DU. In addition, various embodiments of the disclosure propose a message for controlling a resource transmitted from the RIC to the O-DU.

FIG. 1 illustrates an example of a $4^{th}$ generation (4G) long-term evolution (LTE) core system according to an embodiment of the disclosure.

Referring to FIG. 1, an LTE core system includes a base station 110, a terminal 120, a serving gateway (S-GW) 130, a packet data network gateway (P-GW) 140, a mobility management entity (MME) 150, a home subscriber server (HSS) 160, and a policy and charging rule function (PCRF) 170.

The base station 110 is a network infrastructure which provides wireless access to the terminal 120. For example, the base station 110 is a device for performing scheduling by collecting state information such as a buffer state, available transmission power, a channel state of the terminal 120. The base station 110 has coverage defined for a predetermined geographical area, based on the distance from which a signal can be transmitted. The base station is connected the MME 150 through an S1-MME interface. The base station 110 may be referred to as, other than "base station", an "access point (AP)", an "evolved NodeB (eNB)", a "wireless point", a "transmission/reception point (TRP)", or other terms having equivalent technical meanings.

The terminal 120 is a device used by a user, and performs communication with the base station 110 through a wireless channel. In some cases, the terminal 120 may be managed without user involvement. That is, at least one of the terminal 120 and the terminal 120 is a device for performing machine-type communication (MTC), and may not be carried by the user. The terminal 120 may be referred to as, other than "terminal", a "user equipment (UE)", a "mobile station", a "subscriber station", a "customer-premises equipment (CPE)", a "remote terminal", a "wireless terminal", a "user device", or other terms having equivalent technical meanings.

The S-GW 130 provides a data bearer and generates or controls the data bearer according to control of the MME 150. For example, the S-GW 130 processes a packet arrived from the base station 110 or a packet to be forwarded to the base station 110. In addition, the S-GW 130 may perform an anchoring role when the terminal 120 performs a handover between base stations. The P-GW 140 may function as a connectivity point with an external network (e.g., an Internet network). In addition, the P-GW 140 allocates an Internet protocol (IP) address to the terminal 120, and performs an anchoring role for the S-GW 130. In addition, the P-GW 140 applies a quality of service (QoS) policy of the terminal 120, and may manage account data.

The MME 150 manages mobility of the terminal 120. In addition, the MME 150 may perform authentication, bearer management, or the like for the terminal 120. That is, the MME 150 is responsible for mobility management and various control functions for the terminal. The MME 150 may interwork with a serving GPRS support node (SGSN).

The HSS 160 stores a subscriber profile and key information for authentication of the terminal 120. The subscriber profile and the key information are transferred from the HSS 160 to the MME 150 when the terminal 120 accesses a network.

The PCRF 170 defines policy and charging rules. The stored information is transferred from the PCRF 180 to the P-GW 140, and the P-GW 140 may perform control (e.g., QoS management, charging, and the like) to the terminal 120, based on information provided from the PCRF 180.

A carrier aggregation (hereinafter, 'CA') technology is a technology in which multiple component carriers are aggregated and one terminal transmits/receives a signal by simultaneously using such multiple component carriers so that frequency usage efficiency in terms of the terminal or the base station is increased. Specifically, according to the CA technology, the terminal and the base station may use the multiple component carriers in each of an uplink (UL) and a downlink (DL) to transmit/receive a signal using broadband, and in this case, the respective component carriers are located at different frequency bands. Hereinafter, the uplink means a communication link on which the terminal transmits a signal to the base station, and the downlink means a communication link on which the base station transmits a signal to the terminal. In this case, the number of uplink component carriers and the number of downlink component carriers may be different from each other.

A dual connectivity or multi connectivity technology is a technology in which one terminal is connected to multiple different base stations and transmits/receives a signal by simultaneously using carriers in each of the multiple base stations located at different frequency bands so that frequency usage efficiency in terms of the terminal or the base station is increased. The terminal may transmit/receive traffic by being simultaneously connected to a first base station (e.g., a base station which provides a service by using an LTE technology or a 4G mobile communication technology) and a second base station (e.g., a base station which provides a service by using a new radio (NR) technology or a 5G mobile communication technology). In this case, frequency resources used by the respective base stations may be located at different bands. Accordingly, a scheme which operates based on the dual connectivity technology of the LTE and the NR may be called 5G non-standalone (NSA).

Figure 2A:
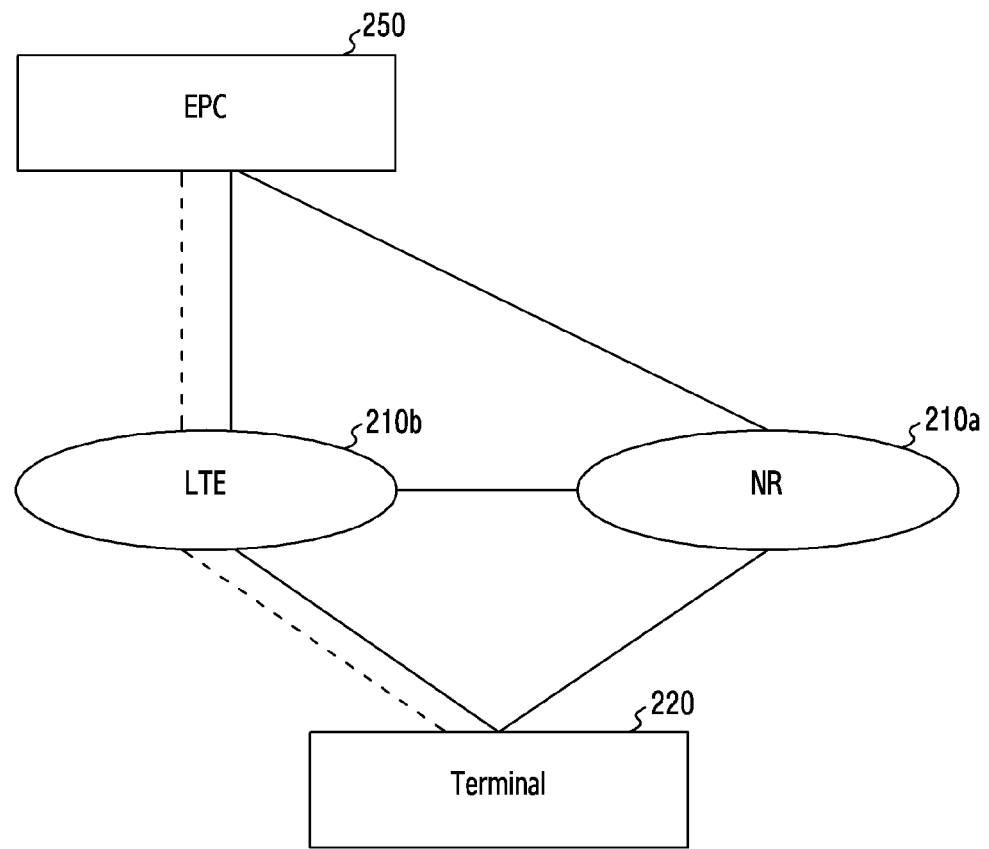
FIG. 2A illustrates an example of a $5^{th}$ generation (5G) non-standalone (NSA) system according to an embodiment of the disclosure.

FIG. 2A illustrates an example of a 5G NSA system according to an embodiment of the disclosure.

Referring to FIG. 2A, a 5G NSA system includes an NR RAN 210a, an LTE RAN 210b, a terminal 220, and an EPC 250. The NR RAN 210a and the LTE RAN 210b may be connected to the EPC 250, and the terminal 220 may receive a service from any one of, or simultaneously both the NR RAN 210a and the LTE RAN 210b. The NR RAN 210a includes at least one NR base station, and the LTE RAN 210b includes at least one LTE base station. Here, the NR base station may be referred to as a "$5^{th}$ generation node", a "next generation nodeB (gNB)", or other terms having equivalent technical meanings. In addition, the NR base station may have a structure divided into a central unit (CU)

and a digital unit (DU), and the CU may have a structure divided into a CU-control plane (CP) unit and a CU-user plane (UP) unit.

In the structure of FIG. 2A, the terminal 220 may perform radio resource control (RRC) access through a first base station (e.g., a base station belonging to the LTE RAN 210b), and may receive a service of a function (e.g., connectivity management, mobility management, and the like) provided in a control plane. In addition, the terminal 220 may receive an additional radio resource for transmitting/receiving data through a second base station (e.g., a base station belonging to the NR RAN 210a). The dual connectivity technology using LTE and NR may be referred to as evolved universal terrestrial radio access (E-UTRA)-NR dual connectivity (DC) (EN-DC). Similarly, the dual connectivity technology in which the first base station uses the NR technology and the second base station uses the LTE technology is referred to as NR-E-UTRA dual connectivity (NE-DC). In addition, various embodiments may be applied to various types of multi connectivity and carrier aggregation technologies. In addition, various embodiments may be also applied to a case where a first system using a first communication technology and a second system using a second communication technology are implemented in one device or a case where a first base station and a second base station are located at the same geographic position.

Figure 2B:
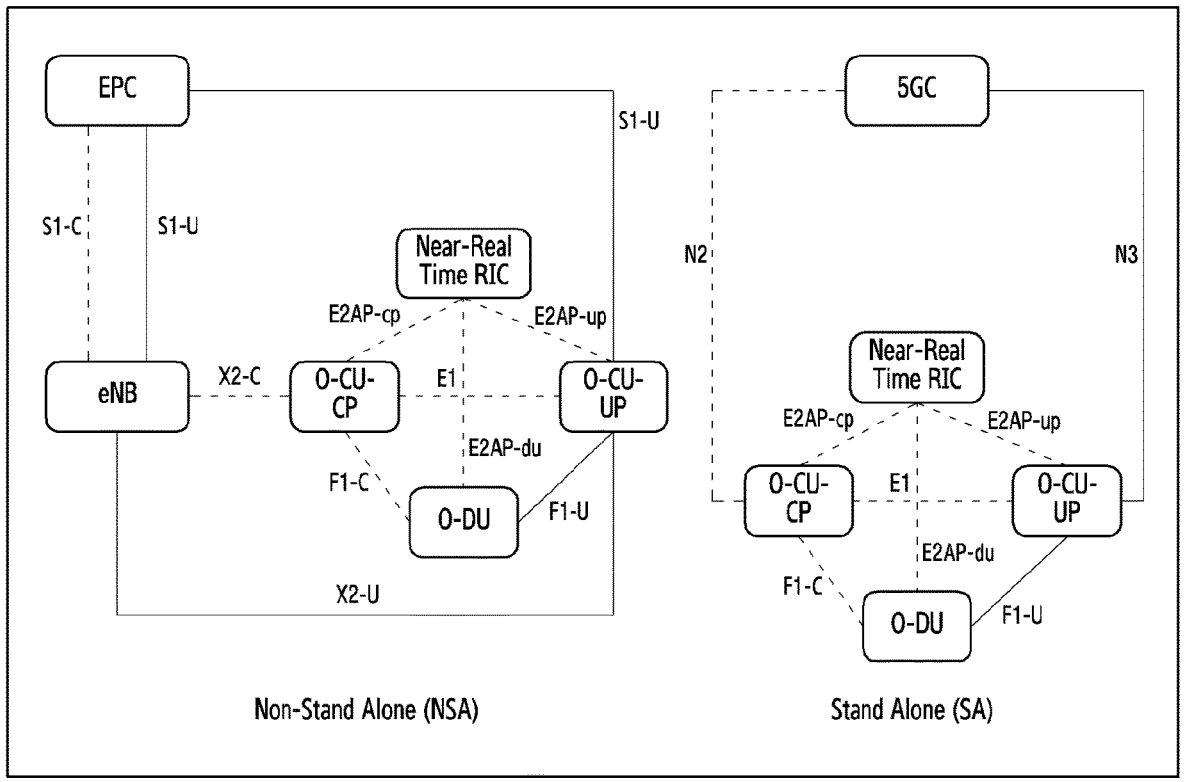
FIG. 2B illustrates an example of an architecture for an O-RAN according to an embodiment of the disclosure.

FIG. 2B illustrates an example of an architecture for an O-RAN according to an embodiment of the disclosure.

For the purpose of E2-SM-key performance indicator (KPI) monitoring (KPIMON) of an E2 service model, an O-RAN non-standalone mode in a multi-connectivity operation using an E-UTRA and NR radio access technology may be considered. Meanwhile, it may be assumed that an E2 node is in an O-RAN standalone mode.

Referring to FIG. 2B, in the deployment of the O-RAN standalone mode, an eNB is connected to an EPC through an S1-C/S1-U interface, and is connected to an O-CU-CP through an X2 interface. The O-CU-CP for the deployment of the O-RAN standalone mode may be connected to a 5G core (5GC) through an N2/N3 interface.

Figure 3:
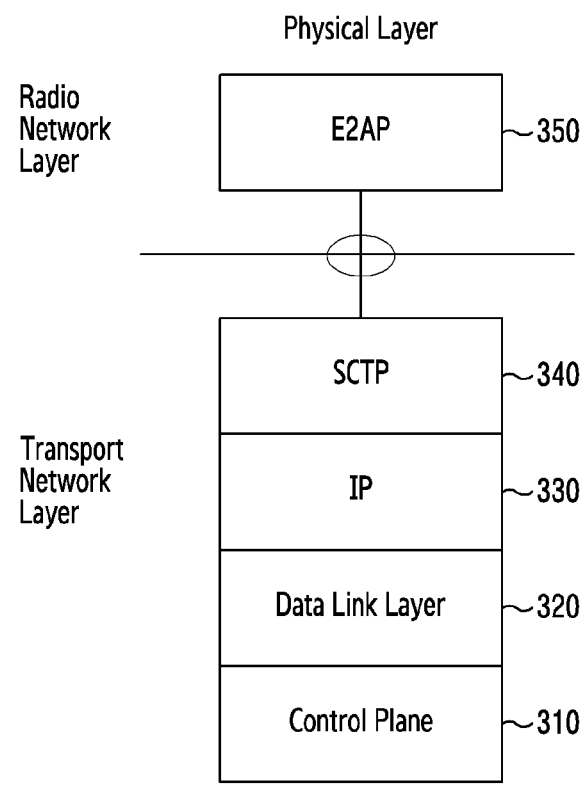
FIG. 3 illustrates a protocol stack of an E2 application protocol message in a radio access network according to an embodiment of the disclosure.

FIG. 3 illustrates a protocol stack of an E2 application protocol message in a radio access network according to an embodiment of the disclosure.

Referring to FIG. 3, a control plane includes a transport network layer and a radio network layer. The transport network layer includes a physical layer 310, a data link layer 320, an Internet protocol (IP) layer 330, and a stream control transmission protocol (SCTP) layer 340.

The radio network layer includes an E2AP 350. The E2AP 350 is used to transfer a subscription message, an indication message, a control message, a service update message, and a service query message, and is transmitted in a higher layer of the SCTP layer 340 and the IP layer 330.

Figure 4:
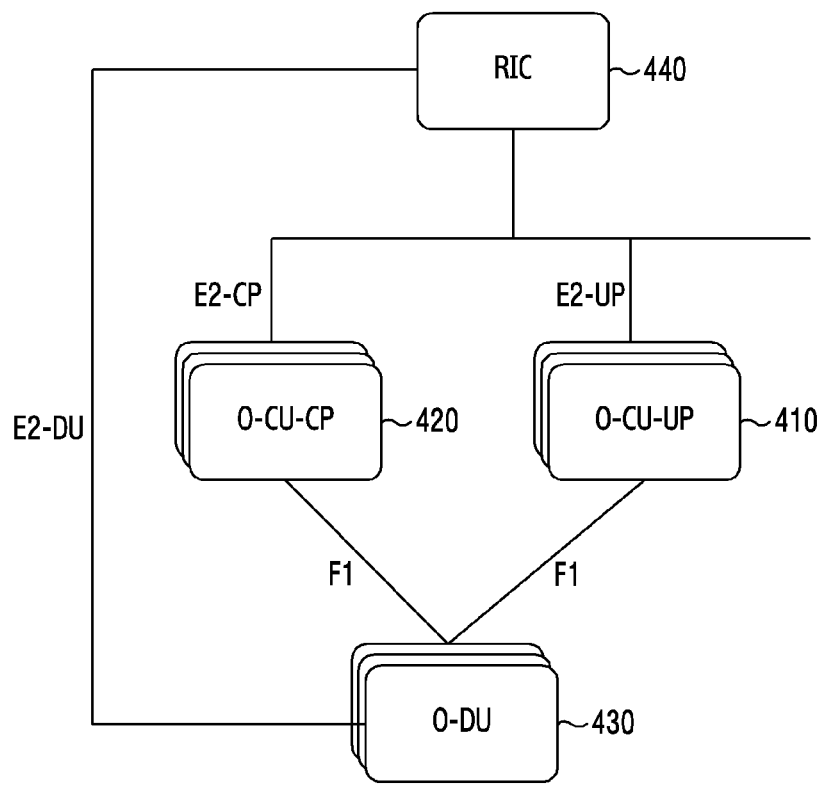
FIG. 4 illustrates an example of a connection between a base station and a radio access network intelligence controller (RIC) in a radio access network according to an embodiment of the disclosure.

FIG. 4 illustrates an example of a connection between a base station and a radio access network intelligence controller (RIC) in a radio access network according to an embodiment of the disclosure.

Referring to FIG. 4, an RIC 440 is connected to an O-CU-CP 420, an O-CU-UP 410, and an O-DU 430. The RIC 440 is responsible for a function for controlling a RAN node (or as a device for performing a RAN function, for example, the O-CU-CP 420, the O-CU-UP 410, and the O-DU 430). The RIC 440 may be defined as a device for customizing RAN functionality for a new service or regional resource optimization. The RIC 440 may provide a function such as network intelligence (e.g., policy enforcement, handover optimization), resource assurance (e.g., radio-link management, advanced self-organized network (SON)), resource control (e.g., load balancing, slicing policy), or the like. The RIC 440 may perform communication with the O-CU-CP 420, the O-CU-UP 410, and the O-DU 430. The RIC 440 may be connected to nodes through E2-CP, E2-UP, and E2-DU interfaces, respectively. In addition, an interface between the O-CU-CP and the DU and between the O-CU-UP and the DU may be referred to as an F1 interface. In the following description, the DU and the O-DU, the CU-CP and the O-CU-CP, and the CU-UP and the O-CU-UP may be interchangeably used.

Although one RIC 440 is illustrated in FIG. 4 for example, multiple RICs may exist according to various embodiments. The multiple RICs may be implemented as multiple hardware entities located at the same physical position or may be implemented through virtualization using one hardware entity.

Figure 5:
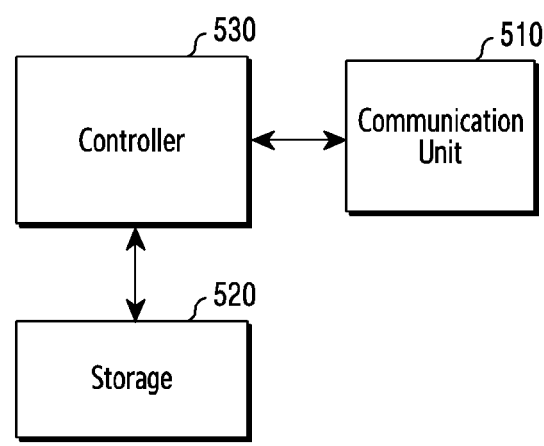
FIG. 5 illustrates a configuration of a device in a radio access network according to an embodiment of the disclosure.

FIG. 5 illustrates a configuration of a device according to an embodiment of the disclosure.

The structure illustrated in FIG. 5 may be understood as a configuration of a device having at least one function among the RIC, O-CU-CP, O-CU-UP, and O-DU of FIG. 4. Hereinafter, the term " . . . unit", " . . . device", or the like implies a unit of processing at least one function or operation, and may be implemented in hardware or software or in combination of the hardware and the software.

Referring to FIG. 5, a core network device includes a communication unit 510, a storage 520, and a controller 530.

The communication unit 510 provides an interface for preforming communication with different nodes in a network. That is, the communication unit 510 converts a bitstream transmitted from the core network device to another device into a physical signal, and converts a physical signal received from another device into a bitstream. That is, the communication unit 510 may transmit and receive a signal. Accordingly, the communication unit 510 may be referred to as a modem, a transmitter, a receiver, or a transceiver. In this case, the communication unit 510 may allow the core network device to communicate with other devices or systems via a backhaul connection (e.g., a wired backhaul or a wireless backhaul) or a network.

The storage 520 stores data such as a basic program, an application program, and setup information for an operation of the core network device. The storage 520 may include a volatile memory, a non-volatile memory, or a combination of the volatile memory and the non-volatile memory. In addition, the storage 520 provides the stored data upon the request of the controller 530.

The controller 530 controls overall operations of the core network device. For example, the controller 530 transmits and receives a signal via the communication unit 510. In addition, the controller 530 records data in and reads data from the storage 520. To this end, the controller 530 may include at least one processor. According to various embodiments, the controller 530 may control the device to perform operations according to various embodiments described in the disclosure.

Figure 6:
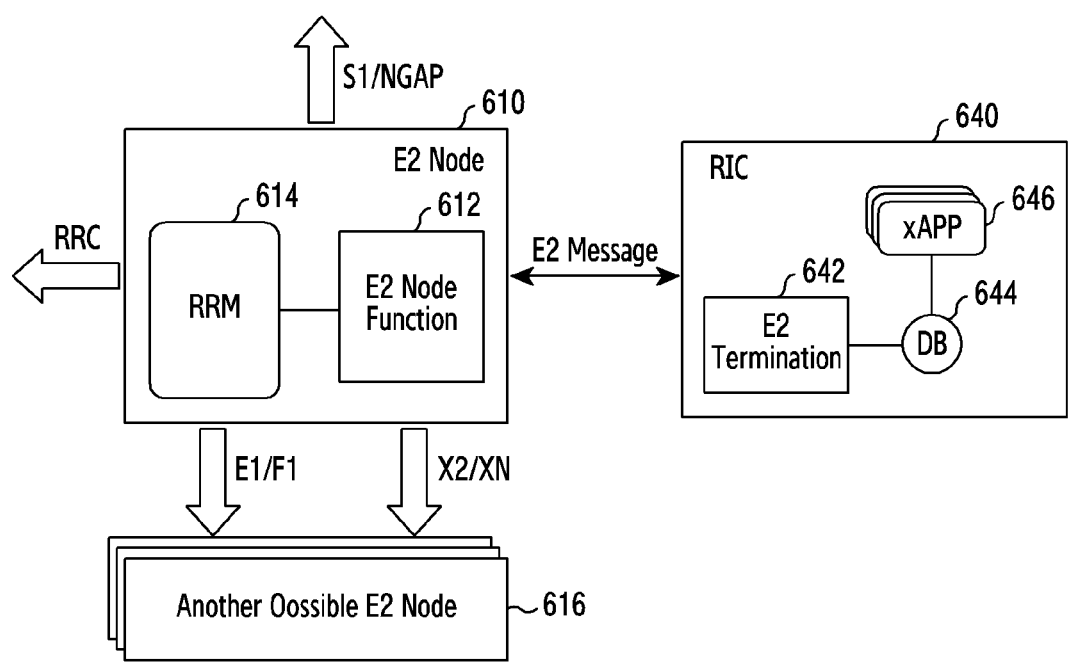
FIG. 6 illustrates a logical function related to an E2 message of an E2 node and an RIC in a radio access network according to an embodiment of the disclosure.

FIG. 6 illustrates a logical function related to an E2 message of an E2 node and an RIC in a radio access network according to an embodiment of the disclosure.

Referring to FIG. 6, an RIC 640 and an E2 node 610 may mutually transmit or receive an E2 message. For example, the E2 node 610 is an O-CU-CP, an O-CU-UP, an O-DU, or a base station. A communication interface of the E2 node may be determined according to a type of the E2 node 610. For example, the E2 node 610 performs communication with another E2 node 616 through an E1 interface or an F1 interface. Alternatively, for example, the E2 node 610 performs communication with the E2 node 616 through an X2 interface or an XN interface. Alternatively, for example, the E2 node 610 performs communication through an S1 interface or a next generation application protocol (NGAP) interface (i.e., an interface between a next generation (NG) RAN node and an AMF).

The E2 node 610 may include an E2 node function 612. The E2 node function 612 is a function corresponding to a specific application S/W xApp 646 installed in the RIC 640. For example, in a case of KPI monitoring, a KPI monitor collection S/W is installed in the RIC 640, and the E2 node 610 includes the E2 node function 612 which generates KPI parameters and then transfers an E2 message including the KPI parameters to an E2 termination 642 located in the RIC 640. The E2 node 610 may include a radio resource management (RRM) 614. The E2 node 610 may manage a resource provided to a radio network for a terminal.

The E2 termination 642 located in the RIC 640 is a termination of the RIC 640 for the E2 message, and performs a function which interprets the E2 message transferred by the E2 node 610 and then transfers the same to the xApp 646. A database (DB) 644 located in the RIC 640 may be used for the E2 termination 642 or the xApp 646. The E2 node 610 illustrated in FIG. 6 is a termination of at least one interface, and may be understood as a termination of messages to be transferred to a terminal, a neighboring base station, and a core network.

Figure 7:
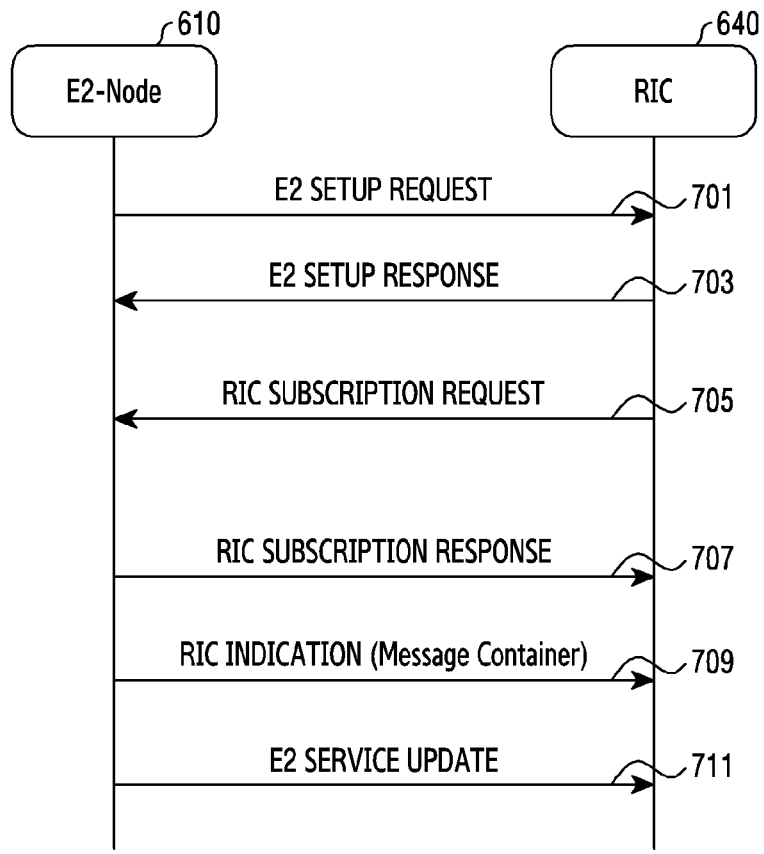
FIG. 7 illustrates an example of a signaling procedure between an E2 node and an RIC according to an embodiment of the disclosure.

FIG. 7 illustrates an example of a signaling procedure between an E2 node and an RIC according to an embodiment of the disclosure.

Specifically, FIG. 7 illustrates an RIC subscription message transfer procedure and a setup procedure of an E2 I/F between the E2 node and the RIC.

Referring to FIG. 7, in operation 701, the E2 node may transmit an E2 set-up request message to the RIC. An E2 node function located in the E2 node finds the RIC by using an RIC IP address which is set to OAM, and transmits an E2 set-up request message. The E2 set-up request message includes RAN function definition which defines a function of a RAN supported by the E2 node, E2 node ID information, or the like. A RAN function definition value is a value which is set to the OAM, and information on a value which is set to the OAM in the RIC is received as the RAN function definition value to determine a call processing function supported by the E2 node.

In operation 703, the RIC may receive an E2 set-up response message from the E2 node. If the E2 set-up request message transmitted by the E2 node is receivable, the RIC may transmit the E2 set-up response message.

In operation 705, the RIC may transmit a subscription request message to the E2 node. A specific xApp located in the RIC requests the RIC E2 termination function to subscribe a specific RAN function definition function supported in the E2. Here, the subscription request message in the operation 705 may be included in the E2 set-up response message in operation 703 and transmitted according to an embodiment.

In operation 707, the E2 node may transmit a subscription request response to the RIC. The E2 node function of the E2 node decodes a subscription request message, successfully configures an event condition that the RIC has requested from the E2 node function, and then transfers successful configuration of an event trigger condition as a subscription response to the RIC.

In operation 709, the E2 node may transmit an E2 RIC indication message to the RIC. When a specific event condition occurs, the E2 node transfers the E2 RIC indication message to the RIC.

In operation 711, the E2 node may transmit a service update message to the RIC. When there is a change in an E2 node function capability information element (RAN function definition), the E2 node transmits to the RIC the changed RAN function definition in E2 service update.

Although the set-up procedure, the RIC subscription procedure, the RIC indication procedure, and the update message transmission procedure are sequentially described in FIG. 7, various embodiments of the disclosure are not limited to the above-described order and procedure. That is, in some embodiments, the E2 node and the RIC may independently perform the E2 set-up procedure of operations 701 to 703. In some embodiments, the E2 node and the RIC may independently perform the subscription procedure of operations 705 to 707. Meanwhile, according to another embodiment, as described above, the E2 set-up response message may include a subscription request message. In some embodiments, the E2 node and the RIC may independently perform the RIC indication procedure of operation 709. In addition, in some embodiments, the E2 node and the RIC may independently perform the RIC indication procedure of operation 709. In addition, the E2 node and the RIC may perform at least some of the above-described procedures together or separately.

Figure 8:
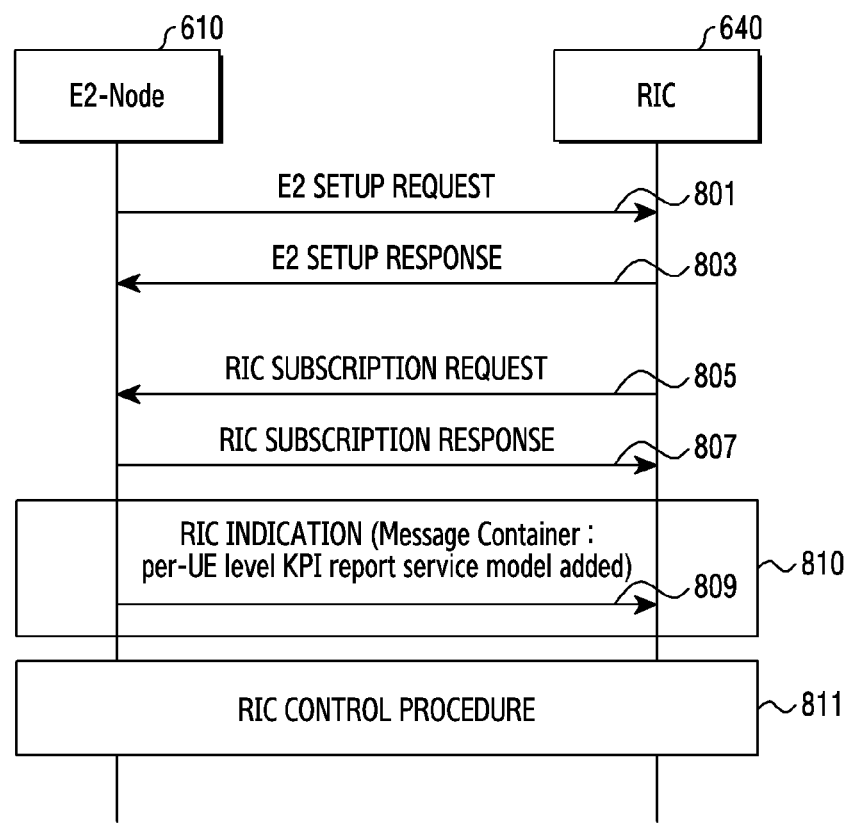
FIG. 8 illustrates another example of a signaling procedure between an E2 node and an RIC according to an embodiment of the disclosure.

FIG. 8 illustrates another example of a signaling procedure between an E2 node and an RIC according to an embodiment of the disclosure.

Specifically, FIG. 8 illustrates an RIC subscription message transfer procedure and a setup procedure of an E2 I/F between the E2 node and the RIC. In addition, in FIG. 8, a procedure of transferring an RIC indication message and an RIC control message is illustrated.

Referring to FIG. 8, in operation 801, the E2 node 610 may transmit an E2 set-up request message to the RIC 640. An E2 node function located in the E2 node 610 finds the RIC by using an RIC IP address of the RIC 640, which is set to operation-administration-maintenance (OAM), and may transmit an E2 set-up request message. The E2 set-up request message may include information (e.g., RAN function definition) on a function of a RAN supported by the E2 node 610, E2 node ID information, or the like. A RAN function definition value is a value which is set to the OAM. For example, the RAN function definition value includes a style ID value. The RIC 640 may receive information on a value which is set to the OAM and determine, based on the RAN function definition value, a call processing function supported by the E2 node 610.

In operation 803, the RIC 640 may receive an E2 set-up response message from the E2 node 610. The RIC 640 may determine whether the E2 set-up request message transmitted by the E2 node 610 is receivable. If the E2 set-up request message is acceptable, the RIC 640 may transmit the E2 set-up response message to the E2 node 610.

In operation 805, the RIC 640 may transmit a subscription request (RIC subscription request) message to the E2 node. A specific xApp located in the RIC 640 requests the RIC E2 termination function to subscribe a specific RAN function definition function supported in the E2. According to an embodiment, as illustrated in FIG. 8, transmission of the subscription request message and transmission of the E2 set-up response message may be separately transmitted. According to another embodiment, the subscription request message of operation 805 may be included in the E2 setup response message of operation 803 and transmitted together.

In operation 808, the E2 node 610 may transmit a subscription request response (RIC subscription response) to the RIC 640. The E2 node function of the E2 node 610 may decode a subscription request message. The E2 node function of the E2 node 610 successfully configures an event condition that the RIC 640 has requested from the E2 node function, and then may transfer successful configuration of an event trigger condition to the RIC 640 through a response (a subscription response) to the subscription request.

In operation 811, the E2 node 610 may transmit an E2 RIC indication message to the RIC 640. The E2 node 610 and the RIC 640 may perform an RIC indication procedure 810. For example, when a specific event condition occurs, the E2 node 610 transfers the E2 RIC indication message to the RIC 640. According to this embodiment of the disclosure, the RIC indication message may include a UE-unit KPI report. According to an embodiment, a message container of the RIC indication message may include a UE-unit KPI report service model. Examples of specific information included in the RIC indication message are described through FIGS. 8 and 9.

Although the set-up procedure, the RIC subscription procedure, the RIC indication procedure, and the RIC control message transmission procedure are sequentially described in FIG. 8, various embodiments of the disclosure are not limited to the above-described order and procedure. That is, in some embodiments, the E2 node and the RIC may independently perform the E2 set-up procedure of operations 801 to 803. In some embodiments, the E2 node and the RIC may independently perform the subscription procedure of operations 805 to 808. Meanwhile, according to another embodiment, as described above, the E2 set-up response message may include a subscription request message. In some embodiments, the E2 node and the RIC may independently perform the RIC indication procedure of operation 809. In addition, in some embodiments, the E2 node and the RIC may independently perform the RIC control procedure of operation 811. In addition, the E2 node and the RIC may perform at least some of the above-described procedures together or separately.

Figure 9:
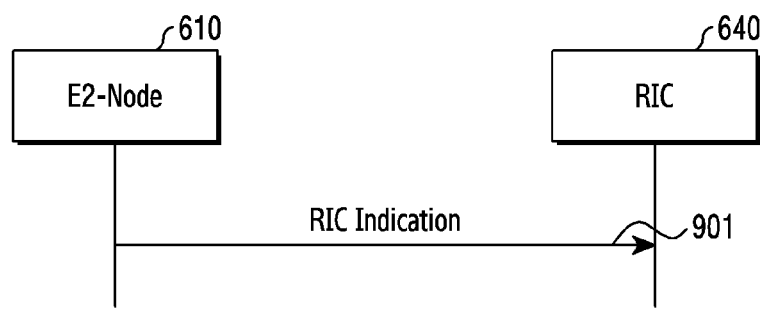
FIG. 9 illustrates an example of an RIC indication procedure according to an embodiment of the disclosure.

FIG. 9 illustrates an example of an RIC indication procedure according to an embodiment of the disclosure.

The RIC indication procedure may include an RIC indication transmission procedure.

Referring to FIG. 9, in operation 901, an E2 node may transmit an RIC indication message to an RIC. The purpose of an RIC indication procedure is to transfer a successful RIG subscription procedure and a message related to reporting, to a near-RT (NRT) RIG corresponding to event trigger detection of the successful RIG subscription procedure, and/or insert an RIG service. An information element (IE) of an E2 indication message may be displayed as show in Table 1 below:

TABLE 1

| IE/Group Name | Presence | Range | IE type and reference | Semantics description | Criticality | Assigned Criticality |
| --- | --- | --- | --- | --- | --- | --- |
| Message Type | M | | 9.2.3 | | YES | reject |
| RIC Request ID | M | | 9.2.7 | | YES | reject |
| RAN Function ID | M | | 9.2.8 | | YES | reject |
| RIC Action ID | M | | 9.2.10 | | YES | reject |
| RIC Indication SN | O | | 9.2.14 | | YES | reject |
| RIC Indication Type | M | | 9.2.15 | | YES | reject |
| RIC Indication Header | M | | 9.2.17 | | YES | reject |
| RIC Indication message | M | | 9.2.16 | | YES | reject |
| RIC Call ID process | O | | 9.2.18 | | YES | reject |

The number indicated in "IE type and reference" may refer to a document of ORAN WG3, O-RAN Working Group 3, Near-Real-time RAN Intelligent Controller, E2 Application Protocol (E2AP)".

The first IE is a message type, and has a unique value for each E2 message. The second IE is an RIG request ID and designates a specific xApp. The third IE is an E2 node function ID and is an identifier for identifying whether the E2 node is an eNB, an O-DU, an O-CU-CP, or an O-CU-UP. The fourth IE is an identifier for identifying an action when an additional action of the RIG occurs. The fifth IE is a sequence number for guaranteeing a sequential action when an additional action of the RIG occurs. The sixth IE is an RIG indication type, and designates whether indication occurrence in the E2 node is a report of a specific process or is an addition to a message of an existing process.

The seventh identifier is a header of the RIC indication message. The details of the header may refer to an RIC indication header defined in the standard of ORAN-WG3.E2SM-KPI-v01.00.docx below.

TABLE 2

This information element is part of the RIC INDICATION message sent by the E2 Node to the Near-RT RIC node and is required for REPORT action.
Direction: E2 Node → NEAR-RT RIC.

| IE/Group Name | Presence | Range | IE type and reference | Semantics description |
|---|---|---|---|---|
| CHOICE Format | | | | |
| >E2SM-KPM Indication Header Format 1 | M | | 8.2.1.3.1 | |
| 8.2.1.3.1 E2SM-KPM Indication Header Format 1 | | | | |
| KPM Node ID | O | | 8.3.20 | |
| Cell Global ID | O | | 8.3.32 | |
| PLMN ID | O | | Served PLMN information [8.3.32] | |
| Slice ID | O | | S-NSSAI [8.3.31] | |
| 5QI | O | | INTEGER (0 . . . 255, . . . ) | 5QI value |
| QCI | O | | INTEGER (0 . . . 255, . . . ) | QCI value |

The eighth identifier is an RIC indication message, and may include container details of a measurement report suggested in the disclosure. The RIC indication message may be configured as shown in following Table:

TABLE 3

| IE/Group Name | Presence | Range | IE type and reference | Semantics description |
|---|---|---|---|---|
| RIC TYPE ID | M | | 8.3.5 | |
| Performance Measurement Container | O | | 8.3.21 | |
| RAN Container | O | | 8.3.27 | |

According to various embodiments, the RIC indication message may include an RIC type. The RIC type ID is a type of a message, and only one type is defined in the current standard. The E2 node ID defines an E2 node performing indication. In the current standard, a global gNB ID, a gNB-CU-UP, a gNB-DU ID, a global en-gNB ID, a global ng-eNB ID, and a global eNB ID are defined. The cell global ID is information of a cell in which measurement is collected, and the PLMN ID is an operator ID in which measurement is collected. The slice ID is an ID of a slice when the E2 node supports stand alone, and the 5QI is an ID that defines QoS when the E2 node supports a standalone mode. The QoS class identifier (QCI) is a QoS ID that is limitedly used when the E2 node supports a non-standalone mode.

In addition, the RIC indication message may include container (e.g., performance measurement container) details. According to various embodiments of the disclosure, the RIC indication message may include information for enhanced quality measurement compared to the existing KPI monitoring. The RIC indication message may include measurement in units of UEs or at a bearer (e.g., DRB) level of a UE, and reporting to the measurement. For example, the RIC indication message is configured as shown in Table 4 below:

TABLE 4

RIC INDICATION MESSAGE IE
This information element is part of the RIC INDICATION message sent by the E2 Node to the Near-RT RIC node and is required for REPORT action.
Direction: E2 Node → NEAR-RT RIC.

| IE/Group Name | Presence | Range | IE type and reference | Semantics description |
|---|---|---|---|---|
| RIC Style Type CHOICE Format | M | | 8.3.3 | |
| >E2SM-KPM Indication Message Format 1 | M | | 8.2.1.4.1 | |
| >E2SM-KPM Indication Message Format 2 | M | | 8.2.1.4.2 | |

8.2.1.4.1
E2SM-KPM Indication Message Format 1

| IE/Group Name | Presence | Range | IE type and reference | Semantics description |
|---|---|---|---|---|
| Sequence of PM Containers | | 1 . . . < maxofContainers> | | |
| >Performance Measurement Container | O | | 8.3.21 | |
| >RAN Container | O | | 8.3.27 | |

| Range bound | Explanation |
|---|---|
| maxofContainers | Maximum no. of Performance Measurement Container. Value is 8. |

8.2.1.4.2
E2SM-KPM Indication Message Format 2

| IE/Group Name | Presence | Range | IE type and reference | Semantics description |
|---|---|---|---|---|
| Sequence of PM Containers | | 1 . . . < maxofContainers> | | |
| >Performance Measurement Container 2 | O | | 8.3.X | |
| >RAN Container | O | | 8.3.27 | |

| Range bound | Explanation |
|---|---|
| maxofContainers | Maximum no. of Performance Measurement Container. Value is 8. |

8.3.21 Performance Measurement Container
This IE indicates the RAN Container lists.

| IE/Group Name | Presence | Range | IE type and reference | Semantics description |
|---|---|---|---|---|
| CHOICE RAN Container | M | | | |
| >O-DU Performance Measurement Container | O | | 8.3.21a | |
| > O-CU-CP Performance Measurement Container | O | | 8.3.21b | |
| > O-CU-UP Performance Measurement Container | O | | 8.3.21c | |

8.3.34 Performance Measurement Container 2
This IE indicates the RAN Container lists for per-UE level KPI monitoring

| IE/Group Name | Presence | Range | IE type and reference | Semantics description |
|---|---|---|---|---|
| CHOICE RAN Container 2 | M | | | |
| >O-DU Performance Measurement Container 2 | O | | 8.3.34a | |
| > O-CU-CP Performance Measurement Container 2 | O | | 8.3.34b | |
| > O-CU-UP Performance Measurement Container 2 | O | | 8.3.34c | |

According to an embodiment, the RIC indication message may further include an IE for indicating a new format (E2SM-KPM Indication Message Format 2) compared to the existing format (e.g., E2SM-KPM Indication Message Format 1). For example, the new format refers to paragraph 8.2.1.4.2.

According to an embodiment, for the IE having the new format, "Performance Measurement Container 2" different from the existing Performance Measurement Container may be defined. The "Performance Measurement Container 2" may refer to paragraph 8.3.34. The term "Performance Measurement Container 2" is merely used to be distinguished from the existing "Performance Measurement Container", and it is not understood that the term limits the embodiment of the disclosure. That is, the "Performance Measurement Container 2" can be replaced with a name of a parameter for performing the same function. Meanwhile, unlike Table 4 above, replacement for "Performance Measurement Container 2" to be described through a scheme of performing detailed configuration of additional IEs for the existing Performance Measurement Container may be also understood as an embodiment of the disclosure.

Referring to paragraph 8.3.34, the "Performance Measurement Container 2" may include at least one of a performance measurement container of an O-DU, a performance measurement container of an O-CU-CP, and a performance measurement container of an O-CU-UP.

The ninth identifier is an RIC call process ID and is an identifier by which the E2 node and the RIC mutually identify an action of a specific event.

The E2 node may carry the container (e.g., measurement report) related to performance measurement in the RIC indication message, and transmit the RIC indication message to the RIC. The RIC indication message according to various embodiments may include a container of a format which is determined according to a type of the E2 node (e.g., O-DU, O-CU-UP, and O-CU-CP). For example, as shown in paragraph 8.3.34 of Table 4, the RIC indication message includes at least one of a performance measurement container of an O-DU, a performance measurement container of an O-CU-CP, and a performance measurement container of an O-CU-UP.

As described above, the E2 node may carry the container related to performance measurement in the RIC indication message, and transmit the RIC indication message to the RIC. The RIC indication message according to various embodiments may include a container of a format which is determined according to a type of the E2 node (e.g., O-DU, O-CU-UP, and O-CU-CP). Alternatively, through the E2 node performance measurement container proposed in the disclosure, the E2 message may include a container of a unified format, regardless of the type of the E2 node.

Consecutive E2 messages may include the same information. When such redundant information is included in the E2 message, more efficient use of a communication resource may be required. To refer to information of a precedent E2 message, the disclosure proposes a scheme of including a specific indicator in the E2 message. When redundant information is included in the consecutive messages, a reception end (e.g., RIC) may refer to an item and a value of a precedent message of the corresponding message through the indicator. Through transferring of only new information other than the redundant information, a communication resource can be efficiently used. As the redundant information is minimized, a traffic bandwidth may be reduced. Hereinafter, an example of an E2 message including an indicator is described through FIG. 10.

FIG. 10 illustrates an example of an RIC indication message according to an embodiment of the disclosure.

Through FIG. 10, an example of a message container transmitted from an E2 node to an RIC is illustrated. Through FIG. 10, among E2 message containers, a message container, which carries an E2 indication message and transmits same from the E2 node to the RIC, is described.

Referring to FIG. 10, a message may include a measurement information item in a measurement information list. The measurement information item may include measurement information and label information. The measurement information may include a performance measurement value. The E2 node may include a measured performance-related cell, PLMN, slice, 5QI, and the like through a label and report the same to the RIC. According to an embodiment, the E2 node may include an indicator in the measurement information list. In addition, according to an embodiment, the E2 node may include an indicator in the measurement information item. The indicator may be an indicator for referring to a label of a precedent message. The indicator may be referred to as a precedent message label override indication. Through the indicator, the E2 node corresponding to a transmission end may refer to the precedent message. The E2 node may omit redundant label information. The E2 node may transmit an E2 indication message which does not include information corresponding to the redundant label. The E2 message may include only the indicator without the information corresponding to the redundant label. The RIC corresponding to a reception end may refer to the precedent message. The RIC may acquire, through the precedent message, information corresponding to the label included in the indicator.

For example, the message in FIG. 10 is configured as shown in the following Table:

TABLE 5

8.3.34a E2 Node Performance Measurement Container
This IE defines per E2 Node Performance Measurement Container IE.

| IE/Group Name | Presence | Range | IE type and reference | Semantics description |
| --- | --- | --- | --- | --- |
| Measurement Information List | | 1 | | |
| >Measurement Information Item | | 1 . . . <maxMeasurementInfo)> | | |
| >>Measurement Information | M | | 8.3.34b | |

TABLE 5-continued 8.3.34a E2 Node Performance Measurement Container
This IE defines per E2 Node Performance Measurement Container IE.

| IE/Group Name | Presence | Range | IE type and reference | Semantics description |
|---|---|---|---|---|
| >>Label Information | M | | 8.3.34c | |
| >Precedent Message Label Override Indication | O | | ENUMERATED (true, . . . ) | Indicates that categories and their values of the first label in the precedent message applies in the same way to the associated measurement, with new category/value (s) if included here. |
| >Measurement Information Sequence Number | O | | INTEGER (0 . . . 255) | |

TABLE 6

| Range bound | Explanation |
|---|---|
| maxMeasurement Info | Maximum no. of measurements that can be reported by a single container. Value is 2^64 (FFS). |

TABLE 7

8.3.34b Measurement Information
This IE defines performance measurements from E2 node for 5GC.

| IE/Group Name | Presence | Range | IE type and reference | Semantics description |
|---|---|---|---|---|
| DL_TotalofAvailablePRBs | O | | INTEGER(0 . . . 273) | TS 28.552 (Section 5.1.1.2.6, DL total available PRB) during reported E2 period |
| UL_TotalofAvailablePRBs | O | | INTEGER(0 . . . 273) | TS 28.552 (Section 5.1.1.2.8 UL total available PRB) during reported E2 period |
| DL PRB Usage | O | | INTEGER(0 . . . 273) | |
| UL PRB Usage | O | | INTEGER(0 . . . 273) | |
| PDCPBytesDL | O | | INTEGER (0 . . . 10,000,000,000, . . . ), . . . ) | DL PDCP SDU Data Volume (For non-split gNB deployment scenario, refer to 28.552 section 5.1.2.1.1 and for split gNB deployment scenario, refer to 28.552 section |

TABLE 7-continued 8.3.34b Measurement Information
This IE defines performance measurements from E2 node for 5GC.

| IE/Group Name | Presence | Range | IE type and reference | Semantics description |
|---|---|---|---|---|
| PDCPBytesUL | O | | INTEGER (0 . . . 10,000,000,000, . . . ), . . . ) | 5.1.3.6.2.1) measured "above" PDCP (Mbits) UL PDCP SDU Data Volume (For non-split gNB deployment scenario, refer to 28.552 section 5.1.2.1.2 and for split gNB deployment scenario, refer to 28.552 section 5.1.3.6.2.2) in the uplink delivered from PDCP layer during the report period (Mbits) |
| Mean Number of RRC connections | O | | INTEGER (1 . . . 65536, . . . ) | TS 28.552 (Section 5.1.1.4.1 Mean number of RRC connections) during the reported E2 period |

TABLE 8

8.3.34c Measurement Label
This IE defines values of necessary categories applicable to an associated measurement value.

| IE/Group Name | Presence | Range | IE type and reference | Semantics description |
|---|---|---|---|---|
| Cell Global ID | O | | Refer to Cell Global ID definition in NGAP/XnAP/NR RRC | |
| PLMN ID | O | | 8.3.33 | |
| Slice ID | O | | 8.3.32 | |
| UE ID | O | | OCTET STRING | UE ID *i.e., GUTI etc., identifier which can distinguish individual terminal for each cell in RAN |
| 5QI | O | | INTEGER (0 . . . 255, . . . ) | 5QI value |
| QCI | O | | INTEGER (0 . . . 255, . . . ) | QCI value |
| QoS Flow Indicator (QFI) | O | | INTEGER (0 . . . 64, . . . ) | |
| ARP | O | | INTEGER (1 . . . 15, . . . ) | |
| 5QI Group mask | | | BitMask 1 byte Use = 1, not use 0 | |
| ARP Group mask | | | (1 . . . 15) | |
| Interface Type | O | | ENUMERATED (F1-U, X2-U, Xn-U, . . . ) | Only applicable to O-CU-UP related measurement values |
| Distribution Bin X | O | | INTEGER (1 . . . 65536, . . . ) | An index of Bin X. Only applicable to distribution type measurement information. |

TABLE 8-continued 8.3.34c Measurement Label
This IE defines values of necessary categories applicable to an associated measurement value.

| IE/Group Name | Presence | Range | IE type and reference | Semantics description |
|---|---|---|---|---|
| Distribution Bin Y | O | | INTEGER (1 . . . 65536, . . . ) | An index of Bin Y. Only applicable to distribution type measurement information. |
| Distribution Bin Z | O | | INTEGER (1 . . . 65536, . . . ) | An index of Bin Z. Only applicable to distribution type measurement information. |
| Precedent Label Override Indication | O | | ENUMERATED (true, . . . ) | Indicates that categories and their values of the precedent label applies in the same way to the associated measurement, with new category/value(s) if included here. |
| Precedent Message Label Override Indication | O | | ENUMERATED (true, . . . ) | Indicates that categories and their values of the first label in the precedent message applies in the same way to the associated measurement, with new category/value(s) if included here. |

Referring to FIG. 10, a precedent RIG indication message 1010 may include a performance measurement container. The performance measurement container may include a measurement information list. For example, a sequence number of the precedent RIG indication message 1010 is N (N is an integer). The measurement information list may include one or more measurement items. Each of the measurement items may include at least one of information on performance information and information on a label. For example, the information on the performance measurement refers to Table 7 above. The information on the label may include a category to be applied to a measurement value. For example, the information on the performance measurement refers to Table 7 above.

After transmitting the precedent RIG indication message 1010, the E2 node may transmit an RIG indication message 1020. The RIG indication message 1020 may be a message subsequent to the precedent RIC indication message 1010. For example, a sequence number of the RIC indication message 1020 is N+1 (N is integer). The RIC indication message 1020 may include an indicator according to embodiments of the disclosure. The indicator may indicate the presence of omitted information since the precedent RIC indication message 1010 and the corresponding RIC indication message 1020 include redundant information. In other words, the indicator may make indication so that the corresponding RIC indication message 1020 refers to a label of the precedent RIC indication message 1010. According to an embodiment, the E2 node may generate the RIC indication message 1020, based on identification of the redundant information related to the precedent RIC indication message 1010. The E2 node may not include values of the label corresponding to the redundancy in the RIC indication message 1020. Instead, the E2 node may include an indicator indicating the redundancy in the RIC indication message 1020. According to an embodiment, the RIC may identify an indicator indicating the redundancy from the RIC indication message 1020. The RIC may refer to the precedent RIC indication message 1010, based on the identification of the indicator indicating the redundancy. The RIC may detect information omitted from the RIC indication message 1020 by referring to the precedent RIC indication message 1010.

According to an embodiment of the disclosure, a method of an E2 node may include a process of transmitting an indication message to a radio access network (RAN) intelligent controller (RIC), wherein the indication message includes a measurement container, and the measurement container includes measurement information including PRB usage, throughput, latency, etc. based on measurement information for each beam, UE, and bearer of an individual cell. In addition, according to embodiments of the disclosure, the indication message may include an indicator (e.g., precedent message label override indication) for referring to label information of the precedent E2 message.

According to an embodiment, a method of an E2 node may include a process of transmitting an indication message to a radio access network (RAN) intelligent controller (RIC), wherein the indication message includes a measurement container, and the measurement container includes measurement information including PRB usage, throughput, latency, etc. based on measurement information for each beam, UE, and bearer of an individual cell. The indication message may include a precedent message label override indication for referring to label information of the precedent E2 message.

According to an embodiment, an apparatus of an E2 node may include at least one transceiver and at least one processor, wherein the at least one processor is configured to transmit an indication message to a radio access network (RAN) intelligent controller (RIC) by controlling the at least one transceiver, the indication message includes a measurement container, and the measurement container includes measurement information including PRB usage, throughput, latency, etc. based on measurement information for each beam, UE, and bearer of an individual cell. In addition, the indication message may include a precedent message label override indication for referring to label information of the precedent E2 message.

The RIC indication message of the disclosure may be a report message. The E2 node may transmit the RIC indication message to the RIC. Here, the RIC indication message may includer an RAN container. The RAN container may include an E2 node performance measurement container. Embodiments of the disclosure propose a scheme of reducing traffic by not only omitting redundant information in the same message but also omitting redundant information between consecutive E2 messages. Through a precedent message label override indicator (precedent message label override indication) (or may be referred to as a reference indicator), it may be indicated that the same corresponding category and values of the precedent message is applied to a current message. Through whether or not the indicator is included, or through explicit indication, whether there is redundancy may be indicated. The redundancy indicator may be configured to indicate whether a precedent message is referred to.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Furthermore, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Furthermore, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an E2 node, the method comprising:
   transmitting a first indication message to a radio access network (RAN) intelligent controller (RIC) through an E2 interface; and
   transmitting a second indication message to the RIC through the E2 interface,
   wherein the first indication message comprises a measurement container,
   wherein the measurement container comprises measurement information and label information relating to a category related to measurement,
   wherein the second indication message comprises a reference indicator, and
   wherein the reference indicator indicates to use the measurement information or the label information of the first indication message.

2. The method of claim 1, wherein the measurement information comprises at least one of a downlink total physical resource block (PRB) size, an uplink total PRB size, downlink PRB usage, uplink PRB usage, a downlink packet data convergence protocol (PDCP) data size, an uplink PDCP data size, and a mean number of radio resource control (RRC) connections.

3. The method of claim 1, wherein the label information comprises at least one of a cell global identifier (ID), a public land mobile network (PLMN) ID, a slice ID, a terminal ID, a 5G quality of service (QoS) identifier (5QI), a QoS class identifier (QCI), a QoS flow identifier (QFI), an allocation retention priority (ARP), a 5QI group mask, an ARP group mask, or an interface type.

4. The method of claim 1,
   wherein the second indication message does not comprise the measurement information or the label information indicated by the reference indicator, and
   wherein the E2 node is one of a radio unit (RU), a distributed unit (DU), a central unit (CU), a CU-control plane (CP), or a CU-user plane (UP).

5. A method performed by a radio access network (RAN) intelligent controller (RIC), the method comprising:
   receiving a first indication message from an E2 node through an E2 interface; and
   receiving a second indication message from the E2 node through the E2 interface,
   wherein the first indication message comprises a measurement container,
   wherein the measurement container comprises measurement information and label information relating to a category related to measurement,
   wherein the second indication message comprises a reference indicator, and
   wherein the reference indicator indicates to use the measurement information or the label information of the first indication message.

6. The method of claim 5, wherein the measurement information comprises at least one of a downlink total physical resource block (PRB) size, an uplink total PRB size, downlink PRB usage, uplink PRB usage, a downlink packet data convergence protocol (PDCP) data size, an uplink PDCP data size, or a mean number of radio resource control (RRC) connections.

7. The method of claim 5, wherein the label information comprises at least one of a cell global identifier (ID), a public land mobile network (PLMN) ID, a slice ID, a terminal ID, a 5G quality of service (QoS) identifier (5QI), a QoS class identifier (QCI), a QoS flow identifier (QFI), an allocation retention priority (ARP), a 5QI group mask, an ARP group mask, or an interface type.

8. The method of claim 5,
wherein the second indication message does not comprise the measurement information or the label information indicated by the reference indicator, and
wherein the E2 node is one of a radio unit (RU), a distributed unit (DU), a central unit (CU), a CU-control plane (CP), and a CU-user plane (UP).

9. An apparatus of an E2 node, the apparatus comprising:
at least one transceiver; and
at least one processor,
wherein the at least one processor is configured to:
transmit a first indication message to a radio access network (RAN) intelligent controller (RIC) through an E2 interface, and
transmit a second indication message to the RIC through the E2 interface,
wherein the first indication message comprises a measurement container,
wherein the measurement container comprises measurement information and label information relating to a category related to measurement,
wherein the second indication message comprises a reference indicator, and
wherein the reference indicator indicates to use the measurement information or the label information of the first indication message.

10. The apparatus of claim 9, wherein the measurement information comprises at least one of a downlink total physical resource block (PRB) size, an uplink total PRB size, downlink PRB usage, uplink PRB usage, a downlink packet data convergence protocol (PDCP) data size, an uplink PDCP data size, or a mean number of radio resource control (RRC) connections.

11. The apparatus of claim 9, wherein the label information comprises at least one of a cell global identifier (ID), a public land mobile network (PLMN) ID, a slice ID, a terminal ID, a 5G quality of service (QoS) identifier (5QI), a QoS class identifier (QCI), a QoS flow identifier (QFI), an allocation retention priority (ARP), a 5QI group mask, an ARP group mask, or an interface type.

12. The apparatus of claim 9,
wherein the second indication message does not comprise the measurement information or the label information indicated by the reference indicator, and
wherein the E2 node is one of a radio unit (RU), a distributed unit (DU), a central unit (CU), a CU-control plane (CP), and a CU-user plane (UP).

13. An apparatus of a radio access network (RAN) intelligent controller (RIC), the apparatus comprising:
at least one transceiver; and
at least one processor,
wherein the at least one processor is configured to:
receive a first indication message from an E2 node through an E2 interface, and
receive a second indication message from the E2 node through the E2 interface,
wherein the first indication message comprises a measurement container,
wherein the measurement container comprises measurement information and label information relating to a category related to measurement,
wherein the second indication message comprises a reference indicator,
wherein the reference indicator indicates to use the measurement information or the label information of the first indication message.

14. The apparatus of claim 13, wherein the measurement information comprises at least one of a downlink total physical resource block (PRB) size, an uplink total PRB size, downlink PRB usage, uplink PRB usage, a downlink packet data convergence protocol (PDCP) data size, an uplink PDCP data size, or a mean number of radio resource control (RRC) connections.

15. The apparatus of claim 13, wherein the label information comprises at least one of a cell global identifier (ID), a public land mobile network (PLMN) ID, a slice ID, a terminal ID, a 5G quality of service (QoS) identifier (5QI), a QoS class identifier (QCI), a QoS flow identifier (QFI), an allocation retention priority (ARP), a 5QI group mask, an ARP group mask, or an interface type.

16. The apparatus of claim 13,
wherein the second indication message does not comprise the measurement information or the label information indicated by the reference indicator, and
wherein the E2 node is one of a radio unit (RU), a distributed unit (DU), a central unit (CU), a CU-control plane (CP), and a CU-user plane (UP).

* * * * *